Nov. 3, 1936.                A. C. FELD                2,059,684
                         SELF SEATING VALVE
                        Filed Jan. 20, 1936
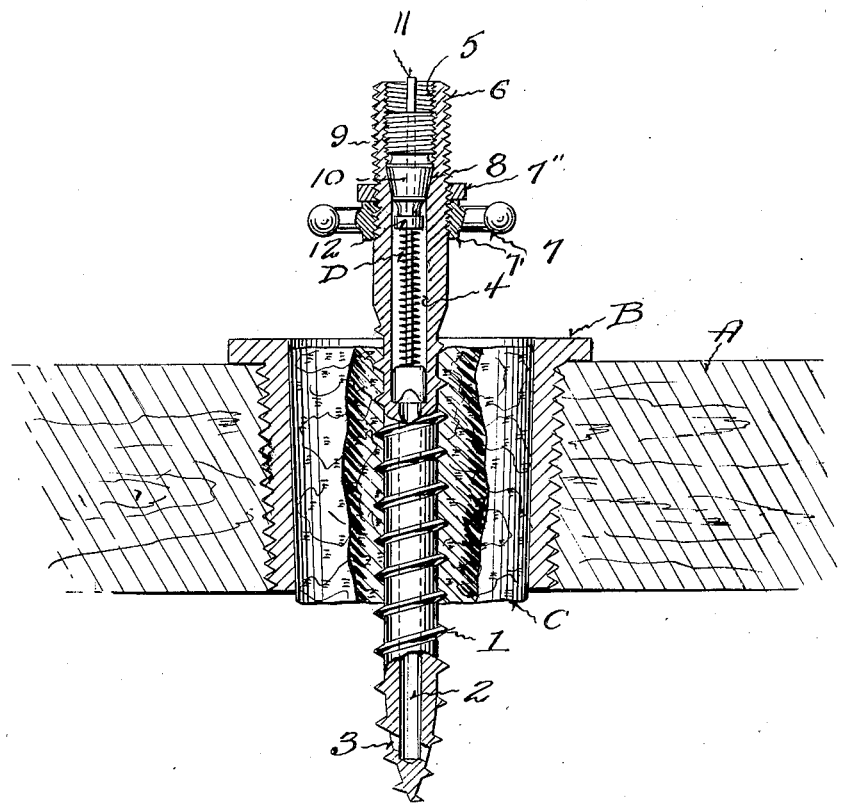
Inventor
A-C-Feld
By
Attorneys Patented Nov. 3, 1936

2,059,684

UNITED STATES PATENT OFFICE 2,059,684

SELFSEATING VALVE

Arwin C. Feld, Sheboygan, Wis.

Application January 20, 1936, Serial No. 59,919

2 Claims. (Cl. 217—99)

My invention relates to pressure valves particularly adapted for use in tapping beer kegs, or the like, whereby an auxiliary pressure head is injected into the container.

In practice, kegs are provided with a filling bung usually closed and sealed by a cork. My invention contemplates producing an extremely simple and economical valve stem having a threaded shank, whereby said valve may be inserted through the cork by twisting the stem without the aid of a mechanic, and when so seated the valve is absolutely tight and can be attached to any means for receiving and discharging fluid under pressure, which fluid is usually pure air.

With the above objects in view, the invention consists in certain peculiarities of construction and combination of parts, as will be hereinafter set forth with reference to the accompanying drawing, and subsequently claimed.

The drawing illustrates a sectional elevation, with parts broken away and in section to more clearly illustrate structural features of a self-seating valve embodying the features of my invention, the valve being shown as inserted through a cork or bung preparatory to receiving the usual air under pressure, whereby the contents of the keg or barrel can be readily discharged in the usual manner.

In the drawing, A represents the head of a keg provided with a metallic bung thimble B, which has tightly fitted therein a plug or cork C, all of said parts being of standard structure. The valve comprises a one-piece straight stem, the lower portion of which is formed with an exterior wood-screw thread 1. The stem is also formed with a centrally disposed channel 2, which extends throughout the stem, and is provided with discharge branches 3—3, at the pointed end of the screw.

The upper portion of the channel 2 is shouldered and increased in diameter, as shown at 4, and the terminal of the channel or port is provided with an internal thread 5, while the exterior surface is formed with a thread 6 adapted to receive an air hose coupling, the hose (not shown) being attached to any type of pump, or other suitable source of air under pressure. The upper exteriorly threaded portion of the one-piece stem is fitted with spanner arms 7, whereby said stem can gradually be revolved to pierce and form its own seat through the cork C. The enlarged portion of the stem bore is also provided with a tapered seat 8, and this enlarged portion has fitted therein a spring-controlled valve unit D. This valve unit is of standard type, and is provided with a screw-threaded head 9 terminating with a flexible plug 10 snugly fitted in the tapered seat 8. The valve is also provided with the usual spring-controlled stem 11, and a valve disc 12, it being understood that the screw head 9 engages the internal threads 5 of the stem.

From the foregoing description it is obvious that when air under pressure enters the stem channel, the spring-controlled valve disc 12 will be lifted from its seat, whereby air will be discharged through said channel to the interior of the keg through the discharge openings 3—3, and when air pressure is relieved from this structure, the spring-controlled valve disc 12 will engage its seat and serve as a check against return of the air to its source of supply.

It will be seen, therefore, that this single screw-threaded stem can be manufactured at a minimum cost, and that it is so simple the same can be supplied to the retail trade, whereby a layman can readily insert the self-seating check valve into position without the aid of any tools, and due to the fact that the lower portion of the stem is threaded, said stem will not only bore through the cork, but will be securely seated therein, whereby the escape of air through the cork will be absolutely prevented, due to the threaded channel stem.

Particular attention is directed to the fact that in order to produce a check valve structure at a minimum cost, the body or stem is milled from a rod or tubular section, and the spanner arm 7 is provided with a ring or hub 7', which is threaded to mesh with the exterior thread 6, and hence in assemblage this spanner arm is run down upon the thread 6 to the base of said thread where said spanner arm seats and is securely bound against further movement, whereby the fitting as a whole can be manually adjusted with reference to the cork. 7'' indicates a lock nut.

While I have shown and described this invention minutely as to all details, it is understood that specific structural details may be varied within the scope of the claims.

I claim:

1. As a new article of manufacture, a pressure check valve for beer kegs or the like comprising a straight one-piece metallic hollow stem having a head portion and a wood-screw threaded at its lower portion, the same being provided with bottom discharge vents and a channel extending therethrough, the upper portion of the channel being enlarged and having a tapered seat threaded at its mouth, means extending from the head end of the stem for manually rotating the same, and a spring-controlled check valve unit fitted into the upper enlarged chamber portion, said check valve having a threaded head for engagement with the threads of the channel, and a tapered plug engaging the tapered seat of the aforesaid channel, said stem being exteriorly threaded at its upper end for engagement with a coupling.

2. As a new article of manufacture, a pressure check valve for beer kegs or the like comprising a straight one-piece metallic hollow stem having an exteriorly threaded head portion and a wood screw threaded at its lower portion, the same being provided with bottom discharge vents and a channel extending therethrough, a spanner in threaded union with the exteriorly threaded head portion of the stem, whereby said stem is manually manipulated, and a spring-controlled check valve unit fitted into the upper channel portion of the aforesaid stem.

ARWIN C. FELD.